(12) United States Patent
Pan

(10) Patent No.: US 10,726,777 B2
(45) Date of Patent: Jul. 28, 2020

(54) TERMINAL DISPLAY METHOD AND APPARATUS

(71) Applicant: ZTE CORPORATION, Shenzhen, Guangdong (CN)

(72) Inventor: Mingdong Pan, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/096,482

(22) PCT Filed: Jul. 21, 2016

(86) PCT No.: PCT/CN2016/090876
§ 371 (c)(1),
(2) Date: Oct. 25, 2018

(87) PCT Pub. No.: WO2017/185541
PCT Pub. Date: Nov. 2, 2017

(65) Prior Publication Data
US 2019/0139487 A1 May 9, 2019

(30) Foreign Application Priority Data
Apr. 25, 2016 (CN) .......................... 2016 1 0261469

(51) Int. Cl.
G09G 5/00 (2006.01)
G09G 3/3208 (2016.01)
(Continued)

(52) U.S. Cl.
CPC .......... *G09G 3/3208* (2013.01); *G09G 3/003* (2013.01); *G06F 3/14* (2013.01); *G09G 2310/08* (2013.01); *G09G 2320/0257* (2013.01); *G09G 2320/0626* (2013.01); *G09G 2320/10* (2013.01); *G09G 2370/022* (2013.01)

(58) Field of Classification Search
CPC .......... G09G 2340/0435; G09G 3/003; G09G 3/3406; G09G 2320/0252; G09G 2320/0261; G09G 2310/061; G09G 2320/0242; G09G 2320/0247; G09G 2320/064; G09G 2310/0237; G09G 2310/0221; G09G 3/22; G09G 3/30; G09G 5/14; H04N 13/341; H04N 13/139; H04N 13/315; H04N 13/332; H04N 13/106;
(Continued)

(56) References Cited

U.S. PATENT DOCUMENTS 7,602,370 B2 * 10/2009 Yamamoto ........... G09G 3/3413
345/102
2005/0259064 A1 * 11/2005 Sugino .................. G09G 3/342
345/102

* cited by examiner

*Primary Examiner* — Duc Q Dinh
(74) *Attorney, Agent, or Firm* — Nath, Goldberg & Meyer; Joshua B. Goldberg

(57) ABSTRACT

Provided is a terminal display method, said method comprising: displaying a picture corresponding to left half-frame data of a current data frame, and starting a first timer; when the count time of said first timer ends, closing the screen brightness; rendering a picture corresponding to the right half-frame data of said current data frame starting a second timer; when the count time of said second timer ends, opening the screen brightness, displaying the picture corresponding to the right half-frame data, and simultaneously starting the first timer; and when the count time of the first timer ends, closing the screen brightness. The present disclosure also provides a terminal display apparatus.

9 Claims, 3 Drawing Sheets

(51) Int. Cl.
*G09G 3/00* (2006.01)
*G06F 3/14* (2006.01)

(58) Field of Classification Search
CPC .... H04N 19/577; G02B 30/24; G02B 27/017; G02B 27/01
USPC .................................................. 345/102, 7–9
See application file for complete search history.

TERMINAL DISPLAY METHOD AND APPARATUS

CROSS-REFERENCE TO RELATED APPLICATION

This is a National Phase Application filed under 35 U.S.C. 371 as a national stage of PCT/CN2016/090876, filed Jul. 21, 2016, an application claiming the benefit of patent application No. 201610261469.X, entitled "Method and Apparatus for Improving Display Effect of Terminal" filed with the Chinese Intellectual Property Office on Apr. 25, 2016, the disclosure of which is incorporated herein by reference.

FIELD OF THE INVENTION

The embodiments of the present disclosure relate to Virtual Reality (VR) technology, and for example, to a terminal display method and apparatus.

BACKGROUND

The VR technology is a computer simulation technology which can create and experience a virtual world, and which can use a computer to generate a simulation environment such that a system simulation incorporating multi-source information into interactive 3D dynamic view and entity behavior is utilized to immerse users therein.

For VR-related products, if the display frame rate of a terminal is not high enough, the user will feel dizzy when staying in this environment for a long time. Generally, in order to improve the user's visual effect, the display frame rate of the terminal can be increased properly. For example, the terminal employs the display frame rate of 90 Hz or 120 Hz, so that the user's visual experience is not delayed to improve the display effect. However, the way of increasing the display frame rate of the terminal requires the use of a special chip, which increase cost, a long development cycle, and lowered practicability.

SUMMARY

In order to solve the technical problems in the related art, the embodiments of the present disclosure provide a terminal display method and apparatus, so as to improve the smoothness of the screen display by controlling ON/OFF of the screen brightness and displaying each frame data separately into two parts. The user experience can be greatly improved with the high utility and the low cost.

In the disclosure, there is provided a terminal display method, including steps of: displaying a picture corresponding to left half-frame data of a current data frame, and starting a first timer; when count time of the first timer has timed out, closing screen brightness; rendering a picture corresponding to right half-frame data of the current data frame, and starting a second timer; when count time of the second timer has timed out, opening the screen brightness, displaying the picture corresponding to the right half-frame data and simultaneously starting the first timer; and when the count time of the first timer has timed out, closing the screen brightness.

According to above method, herein, the screen is an active matrix OLED panel AMOLED screen.

According to above method, herein, a timing duration of the first timer ranges from 2 ms to 3 ms.

According to above method, herein, a timing duration of the second timer ranges from 3 ms to 5 ms.

There is provided a terminal display apparatus, comprising: a display module, configured to display a picture corresponding to left half-frame data of a current data frame, and start a first timer; a screen brightness control module, configured to close screen brightness when count time of the first timer has timed out; and a rendering module, configured to render a picture corresponding to the right half frame data of the current data frame, and start a second timer, and the screen brightness control module is configured to open the screen brightness when count time of the second timer has timed out, display the picture corresponding to the right half-frame data and simultaneously start the first timer; close the screen brightness when the count time of the first timer has timed out.

According to above apparatus, herein, the screen is an active matrix OLED panel AMOLED screen.

According to above apparatus, herein, a timing duration of the first timer ranges from 2 ms to 3 ms.

According to above apparatus, herein, wherein a timing duration of the second timer ranges from 3 ms to 5 ms.

The present disclosure also provides a non-transitory computer readable storage medium, storing computer-executable instructions for performing the terminal display method as described above.

The present disclosure also provides a terminal comprising at least one processor, a memory, and at least one program, wherein the at least one program is stored in the memory, and when executed by the at least one processor, performs the terminal display method as described above.

The terminal display method and apparatus are provided in the present disclosure. For a frame of data frame, when the picture corresponding to the left half frame data of the data frame is first displayed, the first timer is started; after the first timer times out, the screen brightness is turned off; the picture corresponding to the right half frame data of the data frame is rendered, and the second timer is started; after the second timer times out, the screen brightness is turned on, the picture corresponding to the right half frame data is displayed, and simultaneously the first timer is started; after the first timer times out, the screen brightness is turned off. In this way, the frame of data frame can be separately rendered without adding special hardware. In the meanwhile, with the prompt response speed of the screen brightness of Active-Matrix Organic Light Emitting Diode (AMOLED), the afterglow effect can be appropriately removed, thereby improving the smoothness of the screen display and enhancing the user experience.

BRIEF DESCRIPTION OF THE DRAWINGS

In the drawings, which are not necessarily to scale, the like reference numerals may be used to indicate the similar components in the different drawings. The like reference numerals with different letter suffixes may be used to indicate different examples of similar components. The figures generally illustrate the various embodiments discussed herein by way of example and non-limitation.

DETAILED DESCRIPTION OF THE EMBODIMENTS

In embodiments of the present disclosure, the real-time performance of the image rendering can be improved by dividing each of data frames into left and right half frames for rendering and displaying. With the prompt response speed of the AMOLED screen, the screen brightness is turned off in the middle of each frame, so as to achieve the effect that the content of the picture corresponding to the left half-frame data and the afterglow can be quickly cleared. Due to the persistence of the human eye, the picture viewed by the user can be smoother and closer to the real feeling, which can greatly enhance the user experience without adding extra hardware, improve the practicality and lower the cost.

Figure 1:
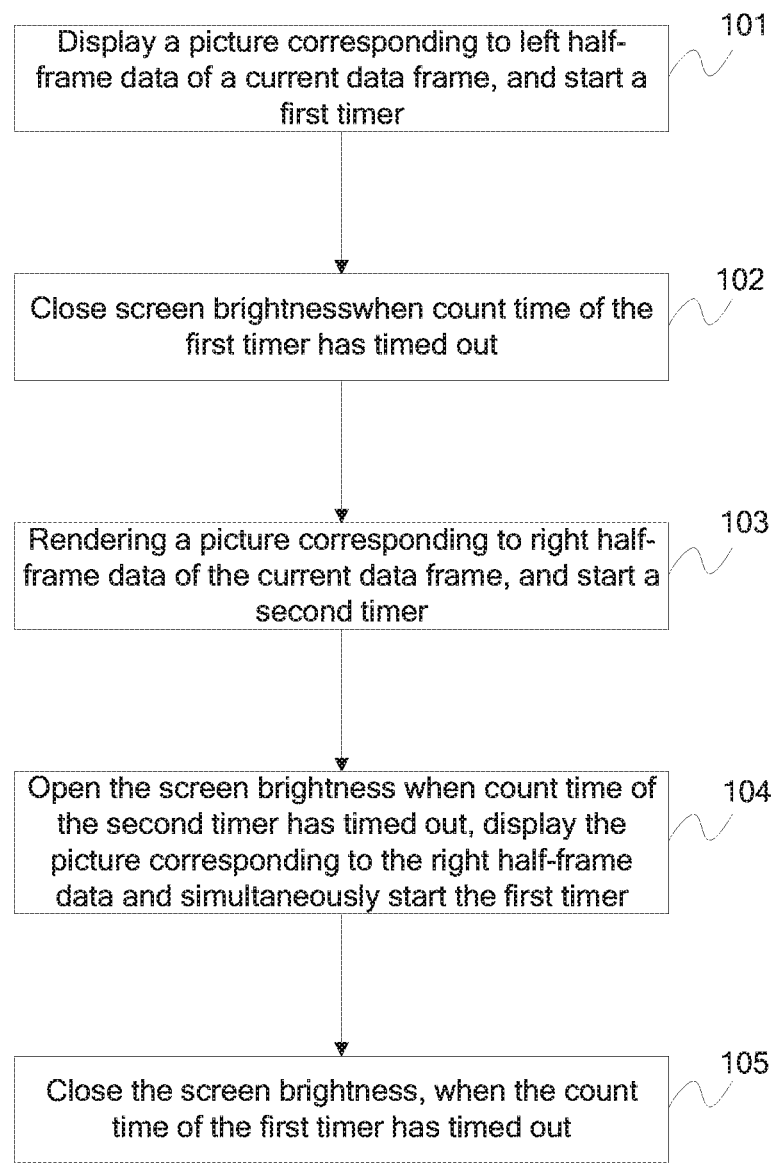
FIG. 1 is a flowchart of a terminal display method according to an embodiment of the present disclosure.

FIG. 1 is a flowchart of a terminal display method according to an embodiment of the present disclosure. As shown in FIG. 1, the method according to this embodiment may specifically include:

Step 101, displaying a picture corresponding to left half-frame data of a current data frame, and starting a first timer;

Step 102, when count time of the first timer has timed out, closing screen brightness, wherein the closing of the screen brightness means that a bit value corresponding to a screen brightness register is modified such that the screen brightness becomes black, but the screen of the terminal is still in a working state at this time;

Step 103, rendering a picture corresponding to right half-frame data of the current data frame, and starting a second timer;

Step 104, when count time of the second timer has timed out, opening the screen brightness, displaying the picture corresponding to the right half-frame data and simultaneously starting the first timer; and Step 105, when the count time of the first timer has timed out, closing the screen brightness.

In the related art, a frame in communication refers to a minimum unit of a single image frame in an image animation, which is equivalent to a frame of lens on a motion picture film. A frame refers to a still picture that is displayed in rapid succession to form a motion picture film. In addition, Frames Per Second (FPS) may refer to the number of pictures transmitted by the terminal per second, that is, the frame rate of the terminal. In the terminal, the higher the frame rate, the smoother the picture displayed by the terminal.

In this embodiment, in order to achieve a display effect having a high frame rate, the screen brightness of the terminal is required to be turned on or off very quickly. Therefore, the screen of the terminal can employ an AMOLED screen. Generally, a timing duration of the first timer is set to be ranged from 2 ms to 3 ms; and a timing duration of the second timer is set to be ranged from 3 ms to 5 ms.

In the process of applying the method according to this embodiment, within a piece of time of each frame data, the frame data is necessarily divided into the left half frame data and the right half frame data for rendering and displaying, respectively. For instance, a screen frame rate of 60 FPS, a timing duration of the first timer of 3 ms and a timing duration of the first timer of 5 ms are taken as an example. That is, the frame time is approximately 16.7 ms. After the picture corresponding to the left half frame data is displayed for 3 ms, the screen brightness is turned off. Since the AMOLED screen has a fast response speed, the afterglow effect can be cleared immediately. During the screen brightness being turned off, the picture according to the right half frame data is rendered by the graphics processing unit (GPU). After 5 ms, when the picture corresponding to the right half frame data is rendered and transmitted to the screen, the screen brightness is turned on again. At this time, the picture corresponding to the right half frame data has been updated. After the picture corresponding to the right half frame data is displayed for 3 ms, the screen brightness is turned off again for about 5.7 ms. Subsequently, the next cycle will be proceeded.

The above operations are completed within a piece of frame time. The smoothness of the screen display can be improved by controlling ON/OFF of the screen brightness and displaying each frame data separately, thereby greatly enhancing the user experience.

For instance, a screen frame rate of 90 FPS, a timing duration of the first timer of 2 ms and a timing duration of the first timer of 3 ms are taken as an example. That is, the number of pictures of the terminal screen transmitted per second is 90, and the frame time is approximately 11.12 ms. After the picture corresponding to the left half frame data is displayed for 2 ms, the screen brightness is turned off. During the screen brightness being turned off, the picture according to the right half frame data is rendered by GPU. After 5 ms, when the picture corresponding to the right half frame data is rendered and transmitted to the screen, the screen brightness is turned on again. At this time, the picture corresponding to the right half frame data has been updated. After the picture corresponding to the right half frame data is displayed for 2 ms, the screen brightness is turned off again for about 5.7 ms. Subsequently, the next cycle will be proceeded.

Figure 2:
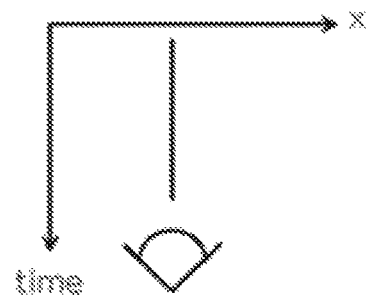
FIG. 2 is a schematic view of a human eye observing a stationary object in the related art.
Figure 3:
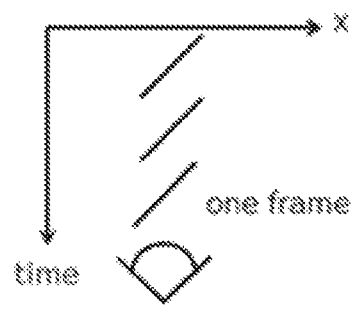
FIG. 3 is a schematic diagram of a human eye observing a dynamic object in the related art.
Figure 4:
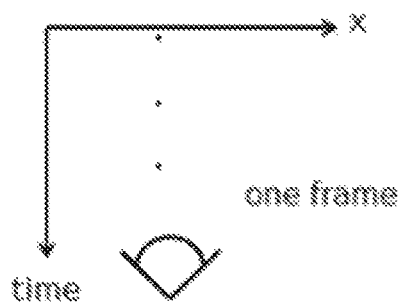
FIG. 4 is a schematic diagram of a human eye observing a dynamic object after applying the terminal display method according to the embodiment.

FIG. 2 is a schematic diagram of a human eye observing a static object; FIG. 3 is a schematic diagram of a human eye observing a dynamic object; and FIG. 4 is a schematic diagram of a human eye observing a dynamic object after applying the terminal display method according to the embodiment. It should be noted that, in this embodiment, the perceivable characteristics of the human eye are utilized. As shown in FIG. 2, in the real life, the human eye is able to observe surrounding static objects. If the human eye simply observes a static object, it can be understood to be that one frame of picture on the screen is seen by the human eye. If the human eye observes multiple static objects simultaneously within a very short period of time with the rotation of head, it can be understood to be that a combination of different frames of pictures on the screen is seen by the human eye. At this point, the human eye observes a set of motion pictures. When the human eye observes the static object, a frame of picture is seen; and when the head rotates, the combination of different frames of pictures is seen. As shown in FIG. 3, if the display frame rate of the screen is not high enough, a tailing phenomenon of picture will occur when the human eye observes the screen, such that a feeling of dizziness is produced on the user.

In the method according to the embodiment, firstly, the entire frame data is divided into two half frames for displaying. On one hand, the real-time performance of the image rendering can be improved for each frame data. On the other hand, each frame data is divided into the left half-frame data and the right half-frame data; after the left half-frame data is displayed, the screen brightness is turned off to promptly clear the content of the picture corresponding to the left half-frame data to eliminate the tailing phenomenon of picture. In the method according to the embodiment, the screen of the terminal can employ an AMOLED screen. With the fast response feature of the AMOLED screen, the content of the picture corresponding to the left half-frame can be quickly cleared after the left half-frame data is displayed. Due to the visual persistence of the human eye, above method can provide a person who is observing the screen with a more fluent visual effect and a feeling closer to reality, thereby enhancing the users' visual experience. As shown in FIG. 4, since, in this embodiment, the picture corresponding to the left half-frame (or the picture corresponding to the right half-frame) has display time shorter than a picture corresponding to entire frame data in the related art. Therefore, in order to further improve the display effect of terminal, in this embodiment, it is possible to enhance the screen brightness when displaying the picture to compensate for the lack of brightness caused by the short display time of the picture corresponding to half-frame data.

Therefore, the method according to this embodiment can improve the user experience of related products such as VR in a relatively easy manner without adding special hardware costs. Substantially, a piece of frame data is rendered by being divided while properly removing the afterglow by taking advantage of the fast brightness response speed of AMOLED screen, thereby improving the smoothness of the screen display and providing a better user experience.

The terminal display method according to the embodiment can improve the fluency of the screen display and improve the user experience without increasing the cost.

Figure 5:
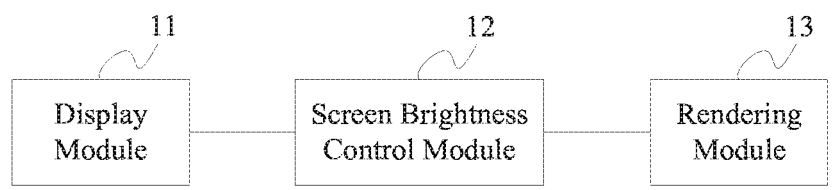
FIG. 5 is a block diagram schematically illustrating a terminal display apparatus according to an embodiment of the present disclosure.

FIG. 5 is a block diagram schematically illustrating a terminal display apparatus according to an embodiment of the present disclosure. As shown in FIG. 5, the apparatus according to this embodiment includes: a display module 11, a screen brightness control module 12, and a rendering module 13.

Herein, the display module 11 is configured to display a picture corresponding to left half-frame data of a current data frame, and start a first timer;

The screen brightness control module 12 is configured to close screen brightness when count time of the first timer has timed out.

The rendering module 13 is configured to render a picture corresponding to the right half frame data of the current data frame, and start a second timer.

The screen brightness control module 12 is configured to open the screen brightness when count time of the second timer has timed out, display the picture corresponding to the right half-frame data and simultaneously start the first timer; close the screen brightness when the count time of the first timer has timed out.

In actual applications, the screen is an AMOLED screen; a timing duration of the first timer ranges from 2 ms to 3 ms; and a timing duration of the second timer ranges from 3 ms to 5 ms.

The terminal display apparatus according to the embodiment of the present disclosure may be used to implement the technical solution of the above process embodiment, and may have similar implementation principle and the technical effect. Therefore, the detailed description thereof will be omitted herein.

In practical applications, the display module 11, the screen brightness control module 12, and the rendering module 13 may each be arranged in a Central Processing Unit (CPU), a Micro Processor Unit (MPU), a Digital Signal Processor (DSP) or a Field Programmable Gate Array (FPGA) in the apparatus for enhancing the display effect of the terminal.

Those skilled in the art will appreciate that embodiments of the present disclosure can be provided as a method, system, or computer program product. Accordingly, the present disclosure can take the form of a hardware embodiment, a software embodiment, or a combination of software and hardware. Moreover, the disclosure can take the form of a computer program product embodied on one or more computer usable storage media (including but not limited to disk storage and optical storage, etc.) in which computer usable program code is embodied.

The present disclosure is described with reference to flowchart and/or block diagrams of methods, apparatus (system), and computer program products according to embodiments of the disclosure. It will be understood that each of steps and/or blocks of the flowchart and/or block diagrams, or the combination of steps and/or blocks of the flowchart and/or block diagrams can be implemented by computer program instructions. These computer program instructions can be provided to a processor of a general purpose computer, special purpose computer, embedded processor, or other programmable data processing device to produce a machine, such that the instructions executed by the processor of the computer or other programmable data processing device can create a means which implements specified functions in one or more flows of the flowchart or in a block or blocks of the block diagram.

The computer program instructions can also be stored in a non-transitory computer readable memory that can boot a computer or other programmable data processing device to operate in a particular manner, such that the instructions stored in the non-transitory computer readable memory can create a product including an instruction means which implements the specified functions in one or more flows of the flowchart or in a block or blocks of the block diagram.

These computer program instructions can also be loaded onto a computer or other programmable data processing device, such that a series of operational steps are performed on a computer or other programmable device to produce computer-implemented processing, and the instructions for execution on the computer or other programmable device can provide a step which implements the specified functions in one or more flows of the flowchart or in a block or blocks of the block diagram.

Figure 6:
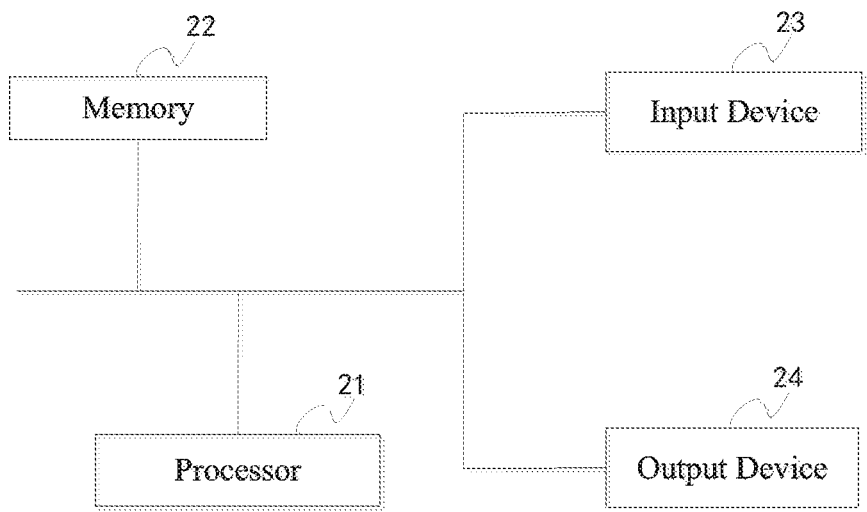
FIG. 6 is a block diagram schematically illustrating hardware of a terminal according to an embodiment of the present disclosure.

FIG. 6 is a block diagram schematically illustrating hardware of a terminal according to an embodiment of the present disclosure. As shown in FIG. 6, the terminal includes: at least one processor 21 and a memory 22.

In FIG. 6, a processor 21 is taken as an example,

The terminal may further include: an input device 23 and an output device 24.

The processor 21, the memory 22, the input device 23, and the output device 24 in the device may be connected by a bus or other means. The bus connection is taken as an example in FIG. 6.

The memory 24 is a non-volatile computer readable storage medium, and can be configured to store a software program, a computer executable program, and a module, such as a program instruction/module corresponding to the terminal display method in the embodiment of the present disclosure (for example, the display module 11, the screen brightness control module 12 and the rendering module 13 as shown in FIG. 5). The processor 21 executes various functional applications and data processing of the server by executing the software program, instructions and modules stored in the memory 22, thereby implementing the terminal display method of the above method embodiments.

The memory 22 may include a storage program area and an storage data area, wherein the storage program area may store an operating system, an application required for at least one function; the storage data area may store data created according to usage of the terminal device, and the like. Further, the memory 22 may include a high speed random access memory, and may also include a nonvolatile memory such as at least one magnetic disk storage device, flash memory device, or other nonvolatile solid state storage device. In some embodiments, the memory 22 can optionally include memory remotely located relative to processor 21, which can be connected to the terminal device over networks. Examples of such networks include, but are not limited to, the Internet, intranets, local area networks, mobile communication networks, and combinations thereof.

The input device 23 can be arranged to receive input digital or character information and to generate key signal inputs related to user settings and function control of the terminal. The output device 24 can include a display device such as a display screen.

One or more modules are stored in the memory 22, and when executed by the one or more processors 21, the terminal display method as described above can be performed.

INDUSTRIAL APPLICABILITY

The embodiment of the present disclosure can improve the real-time performance of picture rendering by dividing each data frame into left and right half frames for displaying and rendering, and the screen brightness in the middle of each frame can be turned off to quickly clear the content of picture corresponding of the left half frame data and the effect of the afterglow.

The invention claimed is:

1. A terminal display method, comprising steps of:
   displaying a picture corresponding to left half-frame data of a current data frame, and starting a first timer;
   when count time of the first timer has timed out, turning off screen brightness;
   rendering a picture corresponding to right half-frame data of the current data frame, and starting a second timer;
   when count time of the second timer has timed out, turning on the screen brightness, displaying the picture corresponding to the right half-frame data and simultaneously starting the first timer; and
   when the count time of the first timer has timed out, turning off the screen brightness.

2. The method according to claim 1, wherein the screen is an active matrix OLED panel AMOLED screen.

3. The method according to claim 1, wherein a timing duration of the first timer ranges from 2 ms to 3 ms.

4. The method according to claim 1, wherein a timing duration of the second timer ranges from 3 ms to 5 ms.

5. A terminal display apparatus, comprising:
   a display module, configured to display a picture corresponding to left half-frame data of a current data frame, and start a first timer;
   a screen brightness control module, configured to turn off screen brightness when count time of the first timer has timed out; and
   a rendering module, configured to render a picture corresponding to the right half frame data of the current data frame, and start a second timer, and
   the screen brightness control module is configured to turn on the screen brightness when count time of the second timer has timed out, display the picture corresponding to the right half-frame data and simultaneously start the first timer; turn off the screen brightness when the count time of the first timer has timed out.

6. The apparatus according to claim 5, wherein the screen is an active matrix OLED panel AMOLED screen.

7. The apparatus according to claim 5, wherein a timing duration of the first timer ranges from 2 ms to 3 ms.

8. The apparatus according to claim 5, wherein a timing duration of the second timer ranges from 3 ms to 5 ms.

9. A non-transitory computer-readable storage medium storing computer-executable instructions, the computer-executable instructions being able to perform the method according to claim 1.

* * * * *